United States Patent [19]
Norris et al.

[11] Patent Number: 5,510,780
[45] Date of Patent: Apr. 23, 1996

[54] TIME CYCLED SECURITY CODE AND ACTIVATION CONTROL SYSTEM

[75] Inventors: Ken D. Norris, Lenexa, Kans.; Dan L. Martin, Liberty, Mo.

[73] Assignee: Profit Plus Corporation, Kansas City, Kans.

[21] Appl. No.: 198,960

[22] Filed: Feb. 18, 1994

[51] Int. Cl.$^6$ .............. H04Q 1/18; G06F 7/04; G08B 21/00
[52] U.S. Cl. .............. 340/825.560; 340/825.33; 340/309.15
[58] Field of Search .......... 340/825.56, 825.31, 340/825.32, 825.33, 825.34, 825.26, 825.27; 345/309.15

[56] References Cited

U.S. PATENT DOCUMENTS

| | | | |
|---|---|---|---|
| 3,860,911 | 1/1975 | Hinman et al. | 340/825.31 |
| 3,906,447 | 9/1975 | Crafton | 340/825.31 |
| 4,348,696 | 9/1982 | Beier | 340/825.31 |
| 4,477,806 | 10/1984 | Mochida et al. | 340/825.56 |
| 4,624,578 | 11/1986 | Green | 340/309.15 |
| 4,644,104 | 2/1987 | Middlemiss | 340/825.32 |
| 4,700,296 | 10/1987 | Palmer, Jr. et al. | 364/401 |
| 4,727,369 | 2/1988 | Rode et al. | 340/825.31 |
| 4,805,722 | 2/1989 | Keating et al. | 340/309.15 |
| 4,812,841 | 3/1989 | Chen | 340/825.31 |
| 4,870,400 | 9/1989 | Downs et al. | 340/825.31 |
| 4,970,504 | 11/1990 | Chen | 340/825.31 |
| 5,043,720 | 8/1991 | Laurienzo | 340/825.32 |
| 5,046,157 | 9/1991 | Smith et al. | 340/309.15 |
| 5,056,141 | 10/1991 | Dyke | 340/825.31 |
| 5,144,659 | 9/1992 | Jones | 340/825.34 |
| 5,367,572 | 11/1994 | Weiss | 340/825.34 |

*Primary Examiner*—Alyssa H. Bowler
*Assistant Examiner*—Mark H. Rinehart
*Attorney, Agent, or Firm*—Litman, McMahon and Brown

[57] ABSTRACT

A self-contained time cycled security code activation system for controlling a piece of power equipment includes a keyboard via which an activation security code is input into a microprocessor. The microprocessor controls an activation relay which selectively controls the equipment and it has stored therein a plurality of security codes which are time cycled via a real time clock. Thus, for example, a different security code can be automatically cycled for each lease or purchase payment interval, such as monthly. The lessee or purchaser is given only the security code or codes for which payment is current. A pair of LED's indicate the keyboard status, including an optional grace period during which the equipment remains operable. If the next month's code is entered during the grace period, the equipment remains operable for the next 30 days. In a second embodiment, the activation code is also a constant security code which is required to be input each time the equipment is used. In this optional arrangement, during the grace period, both the previous month's and the current month's code is valid. In either arrangement, once the grace period has expired, if timely payment has not been made, then the delinquent lessee or purchaser will no longer have access to activate the equipment. A "three strike" feature prevents someone from attempting to circumvent the activation code by randomly entering numbers.

5 Claims, 5 Drawing Sheets

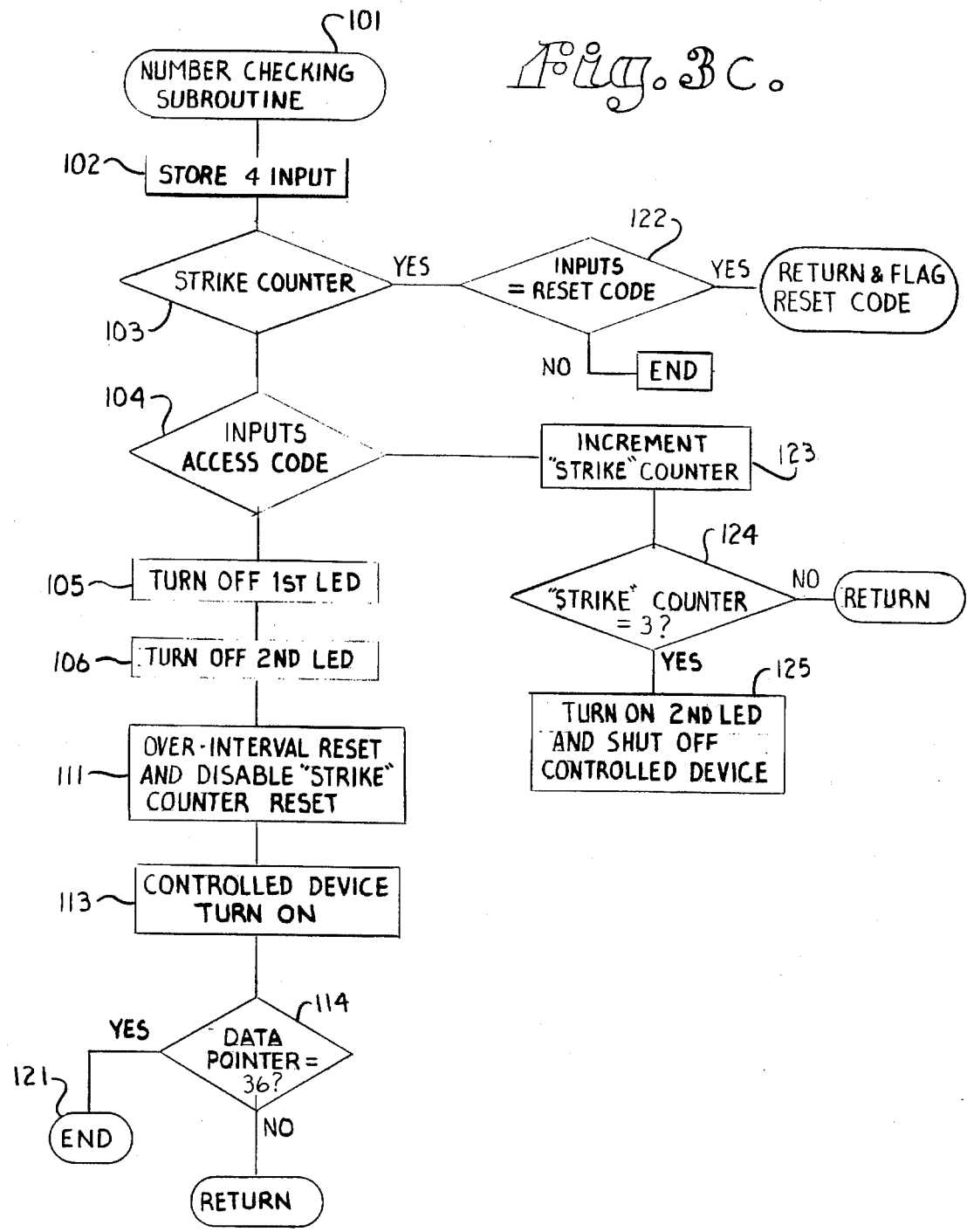

TIME CYCLED SECURITY CODE AND ACTIVATION CONTROL SYSTEM

BACKGROUND OF THE INVENTION

1. Field of the Invention

The present invention relates generally to a security code activation control system for controlling the operation of equipment which is leased or sold on an extended payment plan and more particularly to such a system which is self-contained and in which a combination security code is automatically changed with each billing cycle. In order for the lessee or purchaser to continue to be able to operate the equipment, he must make timely payments, at which time he is given the next security code.

2. Description of the Related Art

The sale of industrial equipment, such as trucks, excavation and grading equipment, forklifts, garage lifts, cranes, etc. is often done on extended payment plans. In addition, the leasing of such equipment, with its minimal down payment terms and accounting, tax and cash flow advantages, is ever increasing. Furthermore, for many of the same reasons, the leasing of major household appliances and automobiles to both consumers and businesses is also on the rise. While leasing and extended payment sales have proven to be advantageous to both the manufacturers and retailers, as well as the ultimate consumers, the timely collection of lease payments and installment sales payments is a constant challenge.

The time honored tradition of simple repossession of the sold or leased goods is becoming less practical all of the time. For example, lessees and installment purchasers have been given ever increasing legal rights under due process decisions of the courts. Damage suits against repossessing parties are a constant threat. Furthermore, in a society in which violent confrontation is becoming more common, there is a physical threat to the repossessing party. In the case of household appliances which are installed within a household, access for repossession purposes is problematical. In the case of industrial equipment such as garage lifts, elevators, hydraulic doors. etc., once installed, they become an integral part of the lessee's building, making physical repossession virtually impossible. Finally, in the case of mobile items such as automobiles and trucks, simply finding the leased item is often difficult.

Various schemes have been devised in the prior art to limit the ability of a purchaser or lessee to use the equipment if he fails to make timely payments. For example, in U.S. Pat. No. 4,624,578 to Green, a rental contract timer system includes a relay which operates the rental equipment, such as a television set. The relay is, in turn, controlled by a timer which is programmable via a magnetically encoded strip to have start and stop times. The relay is only operable during the window between the encoded start and stop times. The problem with this system is the requirement for the rental agency to physically issue a magnetic strip to the renter each time he pays his rent. This strip must then be physically inserted into the timer to update the rental window. Once the rental window is updated, no security code or card is needed to use the equipment.

U.S. Pat. No. 4,805,722 to Keating et al. teaches a vehicle anti-theft system in which authorized drivers are issued magnetic or optically encoded cards. An on board computer stores ID codes and time periods during which properly coded ID cards can operate the vehicle. If a driver's ID card is not current, the vehicle cannot be operated. Again the disadvantages of this system include the requirement for physically issuing and periodically changing the information on an ID card as well as the simultaneous updating of matching information to be stored within the computer.

Other time controlled limited access systems have been devised for appliances, hotel rooms, etc. All of such systems require either a card or other encoded device and/or the periodic updating of activation code or allotted time window information within the control system from an outside source. Such systems work well for rental appliances which must be returned to a central rental location, for example, or for hotel room locks which are hardwired to a central control panel. However, no suitable time dependent activation security code system has been devised for leased or purchased equipment which remains in the possession of the lessee or purchaser, but for which periodic time payments must be made.

It is clear then that a need exists for a time dependent security activation code system for controlling activation to leased or time purchased equipment. Such a system should include a self-contained code activated activation panel which requires a user to enter a valid code before the equipment can be used. The code should be changed at periodic time intervals, which coincide with monthly or quarterly lease periods, for example. These periodic code changes should be automatic, requiring no personnel from the lessor or seller to have access to the equipment, and requiring no telephone or other communications link between the lessor or seller and the equipment.

SUMMARY OF THE INVENTION

In the practice of the present invention, a time cycled security code activation system for leased or time purchased equipment includes a code input device such as a numeric keypad. The keypad is connected to a microcontroller, which may be a microprocessor and peripherals, which controls an activation relay which selectively supplies power to the equipment. The microprocessor is connected to a memory in which is stored a series of activation codes, for example 36 codes, including a currently valid code. The microprocessor is also connected to a real time clock circuit and the microprocessor includes a clock counter for monitoring lease or installment sale period. The microprocessor is programmed to compare the current time, as stored in the clock counter, with an expiration time of a lease or installment purchase period. For example, for equipment for which a lease payment is due by the thirtieth of each month, the microprocessor will compare the date with the twenty-eighth. When the comparison becomes valid, i.e. when the microprocessor recognizes that the date is the twenty-eighth day of the current month, a grace period is started which can run, for example, for 4 days. At the end of the four day period, one of two results will occur, depending upon the embodiment of programmed microcontroller which is installed.

Two different embodiments are visualized for the microcontroller. In a first embodiment, the equipment is operated normally, with no activation code required, e.g., for the first 28 days of each monthly period. After the 28th day, the keypad is activated and the equipment will continue to operate for the next four days. During that four day period, if the next valid code in the series is input, the system will cycle so that it operates normally for the next 28 days. If the next valid code is not input within the grace period, the system will shut down the equipment until the next valid code is input.

3

In the second embodiment, the activation codes serve both a security code and a lease or installment payment securing function. In this embodiment, the lessee or purchaser is given an initial valid activation code, which must be input each time the equipment is used. At the end of the 28 day period mentioned previously, the microprocessor starts a grace period of four days. During the four day grace period, the original activation and security code remains valid. After the grace period has expired, the subsequent activation code is valid and, if the purchaser or lessee has not made his payment, he will not have access to the equipment. In either embodiment, activation of the equipment can thus be controlled by the lessor or seller by only giving out each subsequent activation code in the series when the lease or installment payments of the lessee or purchaser are current.

Another feature of the activation control system is a "three strikes and you are out" feature in which the attempted input of three consecutive invalid codes will disable the system until a special reactivation code is entered. This prevents a user from randomly entering a number of codes in an attempt to stumble onto the correct code. A pair of LED indicators on the keypad are sequenced to show the current system status. To prevent damage to the microprocessor and related circuitry, control of the activation relay is accomplished via an optical isolation circuit.

OBJECTS AND ADVANTAGES OF THE PRESENT INVENTION

The objects and advantages of the present invention include: providing a time cycled security code activation system for leased or installment purchased power equipment or the like: to provide such a system in which an activation relay selectively provides power to such equipment; to provide such a system in which a microcontroller is connected to the activation relay to control the connection of power to the equipment; to provide such a system in which a keypad is connected to the microcontroller for the input of activation codes; to provide such a system in which the microcontroller compares input activation codes from the keypad to a stored valid activation code and activates the relay only during periods when the input code matches the stored activation code; to provide such a system in which the microprocessor stores a series of activation codes, with one of the stored codes being the current activation code; to provide such a system in which the microcontroller includes a clock circuit from which it can access the current time and/or date; to provide such a system in which the microcontroller has a clock counter in which is stored the current time interval and which is compared to a preset time interval; to provide such a system in which the microprocessor, when the interval in the clock counter matches the preset interval, changes the activation code to the next code in the stored code series; to provide such a system in which the microprocessor is programmed to provide a grace period which extends past the end of the time period and during which, in a first embodiment, the equipment remains operative or, in a second embodiment, the current code remains valid; to provide such a system in which the microprocessor includes a safeguard to prevent a user from randomly entering codes in an attempt to hit the stored code; to provide such a system in which a pair of LED indicators are provided on the keypad to indicate system status; and to provide such a system which is reliable, economical to manufacture and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIGS. 3A, 3B and 3C are a logical flow chart illustrating a programmed algorithm for a first embodiment of the time cycled security code activation and control system.

DETAILED DESCRIPTION OF THE PREFERRED EMBODIMENTS

I. Introduction and Environment

Figure 1:
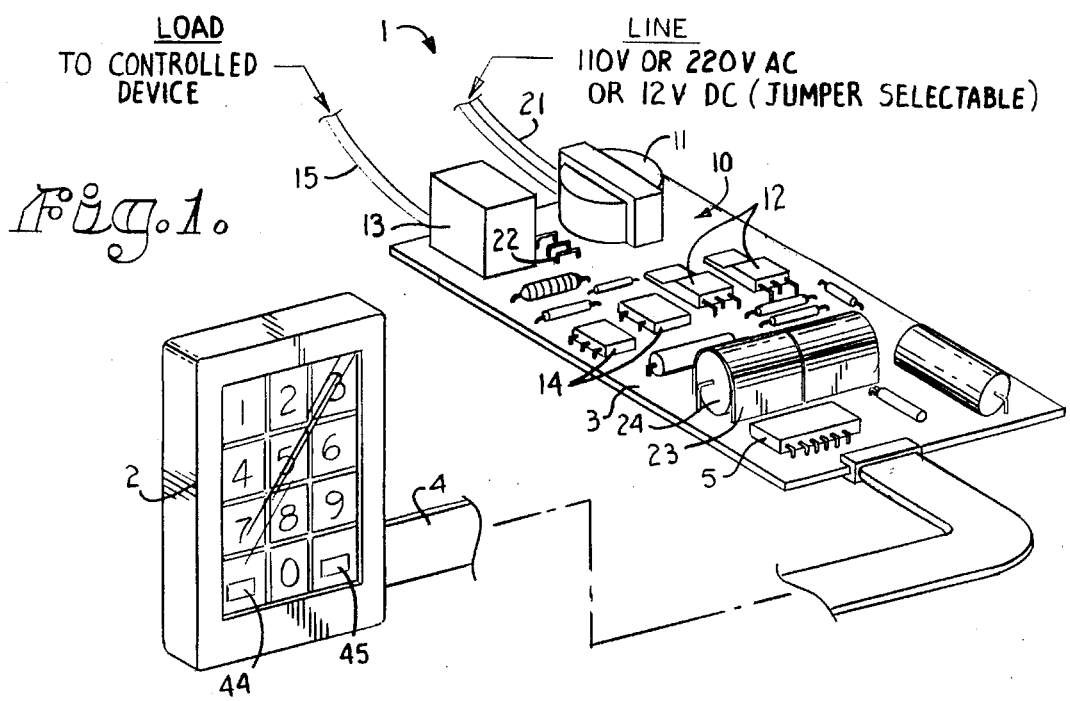
FIG. 1 is a perspective view of a time cycled security code activation system in accordance with the present invention.

As required, detailed embodiments of the present invention are disclosed herein; however, it is to be understood that the disclosed embodiments are merely exemplary, of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "in" and "out" will refer to directions toward and away from, respectively, the geometric center of the structure being referred to. Said terminology will include the words specifically mentioned derivatives thereof and words of similar import.

Figure 2:
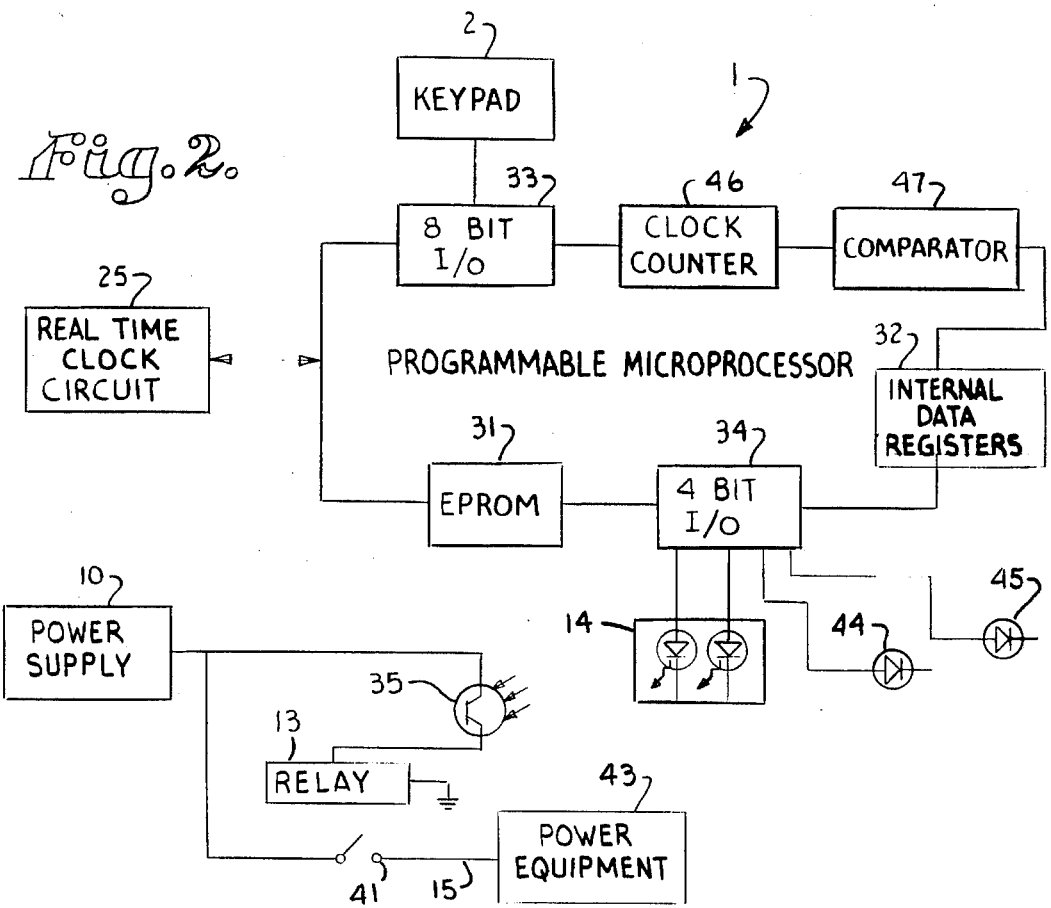
FIG. 2 is an electronic block diagram of the time cycled security code activation system of FIG. 1.

Referring to the drawings in more detail, reference numeral 1 in FIGS. 1 and 2 generally designates a time cycled security code activation and control system in accordance with the present invention. The system 1 includes a numeric keypad 2 which is connected to a circuit board 3 via a cable 4. Attached to the circuit board 3 are a microprocessor 5, which is powered via a power supply 10 including a transformer 11 and a voltage regulator 12. The microprocessor 5 is connected to an activation relay 13 via an optical isolator 14. The activation relay 13 is connected to a piece of equipment to be controlled (not shown) by a power cable 15. The transformer 11 is connected to a power cable 21, and the system is operable on either 110 or 220 volt AC inputs or a 12 volt DC input. The correct input voltage is jumper selectable via a plurality of jumpers 22. The system 1 also includes a battery back-up circuit 23 including a battery 24 to provide continuous power to the microprocessor 5 and a real time clock circuit 25 in the event of power interruptions.

Referring to FIG. 2, the microprocessor 5 is connected to the real time clock circuit 25, an internal EPROM 31, and a plurality of internal data registers 32. The keypad 2 is connected to the microprocessor 5 via an 8 bit I/O port 33, and the opto-isolator 14 is connected via a 4 bit I/O port 34. The relay 13 is connected to the power supply 10 via a photoelectric switch 35. A pair of normally open relay contacts 41, in turn, selectively connects a power source, which may be the system power source 10, to activate the equipment, indicated by block 43. A pair of LED's 44 and 45 are positioned in the keypad 2, and are controlled by respective leads in the 4 bit I/O port 34. The LED 44 can be, for example, green while the LED 45 is red. The LED's 44 and 45 function to indicate system status, as will be explained below. A clock counter 46 and a comparator 47 are provided as well. It should be noted that, although the clock counter 46, comparator 47, etc., although shown as discrete components, can be internal programmed functions of the microprocessor 5. Additional counters described below, such as an over-interval counter, a strike counter and a data pointer, are not shown discretely, but are internal functions of the microprocessor 5.

Figure 3A:
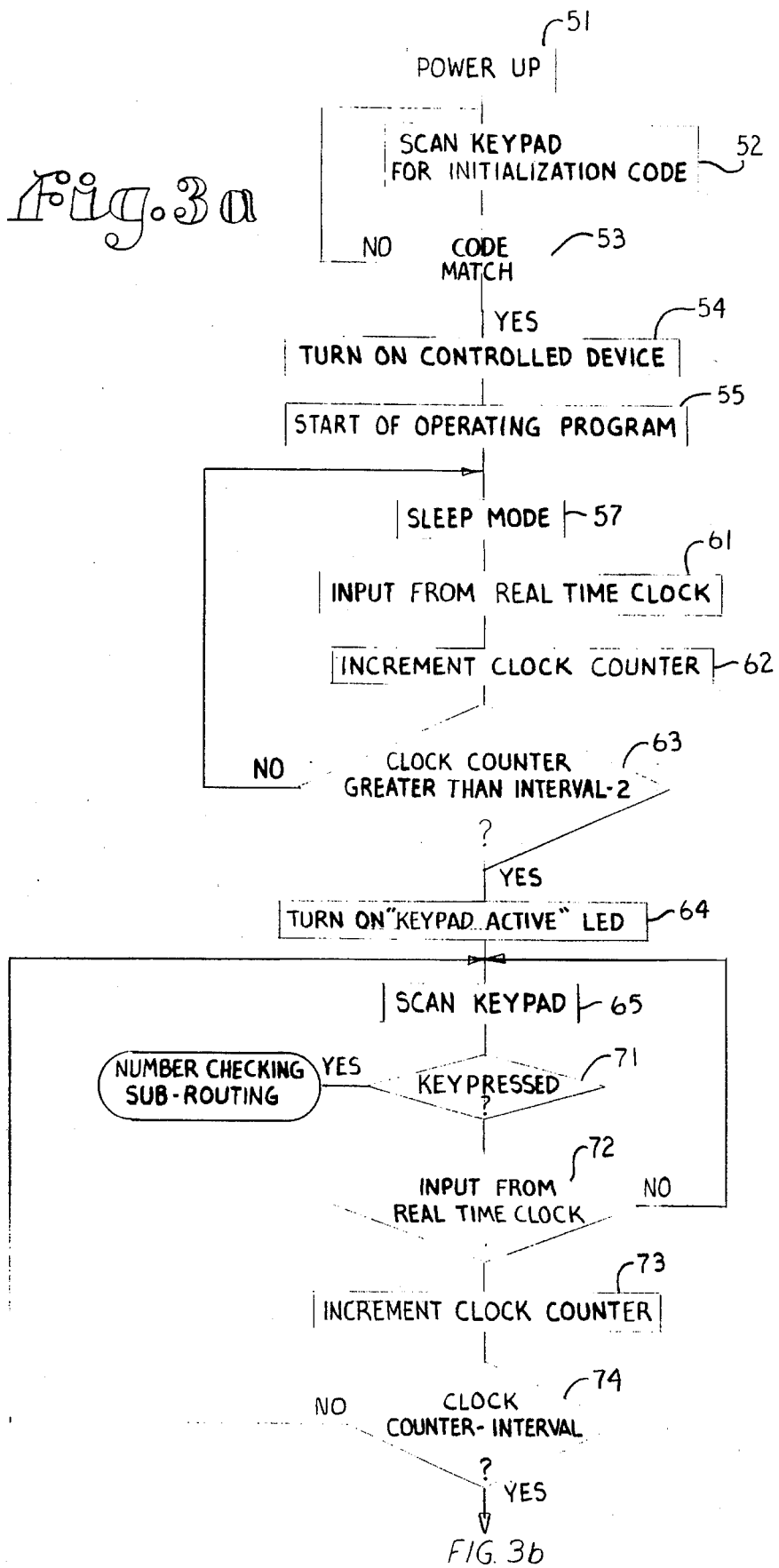
Figure 3B:
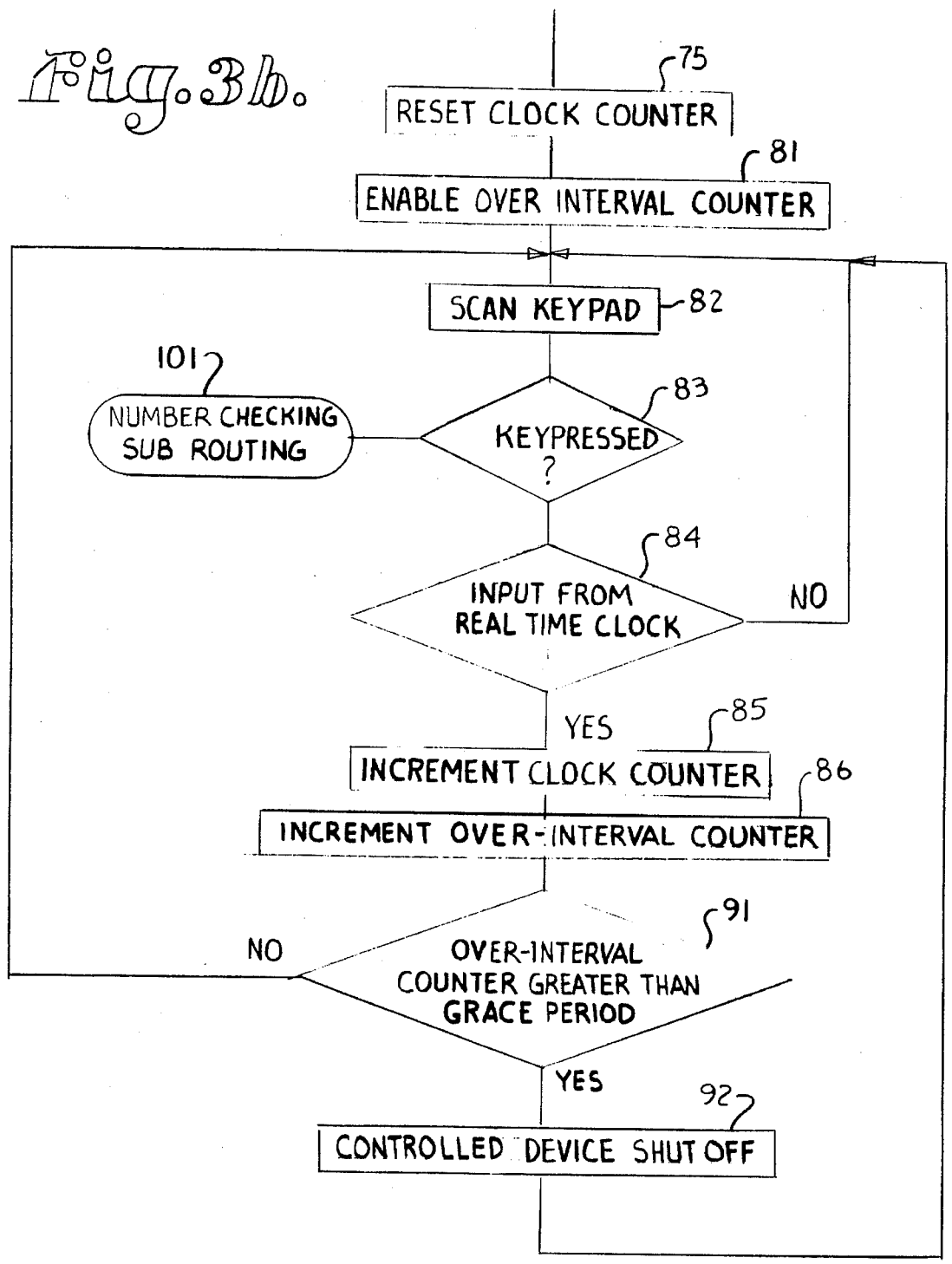

Referring to FIGS. 3A and 3B, a flow chart depicting a logical algorithm of a first embodiment of the system is illustrated. In this embodiment, the equipment 43 to be controlled is normally operative until such time as a lease or payment period expires. Only after the expiration of the time period is the equipment 43 made inoperative until the entry of a valid activation signal. In FIG. 3A, at block 51, when the equipment 43 to be sold or leased is delivered to the customer, the seller or lessor powers up the microprocessor 5. At block 52, the microprocessor 5 scans the keypad 2 for an initialization code which is input by the seller or lessor. At block 53, the initialization code is compared against a valid stored code and, at block 54, the relay 13 is enabled, closing the relay contacts 41 and thus connecting the equipment 43 to a power source while, at block 55, the microprocessor operating program is begun. Block 57 indicates that the system is in "sleep" mode. i.e. the microprocessor 5 keeps the relay 13 enabled so that the power equipment 43 can be operated normally until the passage of a preset time period. Block 61 indicates that the real time clock is being input into the microprocessor 5, which, in response, at block 62, increments the clock counter 46. This incrementation can occur, for example, once per day. At block 63, the clock counter 46 is compared against an interval, such as, for example, one month less 2 days, or twenty-eight days. The system remains in sleep mode until the clock counter is cycled to indicate 28 days. At this point, as indicated at block 64, the green LED 44 is turned on, indicating that the keypad 2 is active. At block 65, the keypad 2 is scanned awaiting a valid activation code, which is only given out when the next month's payment is current. At block 71, if a key is depressed, the system enters a number checking subroutine, as illustrated in FIG. 3C, which will be explained below. At blocks 72 and 73, if no key is pressed, the clock counter 46 continues to be incremented and, at block 74, is compared against the interval, which may be, for example, 30 days. Once the 30 day interval is reached, at block 75, the clock counter is reset to 0 and a data pointer is incremented to select the next valid code. At block 81, an optional over-interval counter is enabled. During this over-interval, or grace period, which may be, for example, an additional 2 days, the keypad 2 (blocks 82 and 83) continues to be scanned for the correct activation code and, at blocks 84, 85 and 86, the clock counter and the over-interval counter are incremented. At block 91, the over-interval counter is compared against the grace period, e.g. 2 days, and, when the grace period is up, at block 92, the relay 13 is shut off, making the equipment 43 inoperative. Meanwhile, the keypad 2 continues to be scanned until the correct code is input.

At FIG. 3C, the number checking subroutine is entered at block 101, the first four numbers (in the case of a four number code) are stored at block 102, and, at block 103, the strike counter is compared to the number 3. If the strike counter is less than 3, at block 104, the input numbers are compared against the currently valid activation code. If the input numbers match the valid code, at blocks 105 and 106, the LED's 44 and 45 are turned off, at block 111, the over-interval counter and the strike counter are reset. At block 113, the equipment 43 is turned on. At block 114, the data pointer is compared against a set number, for example 36, which represents the number of codes stored in the microprocessor 5. If the comparison is valid, at block 121, the system is shut down. At this point, the equipment 43 may have been leased for 36 months, for example, and may require servicing, replacement, etc. If the equipment 43 has been purchased on an installment plan, the equipment may be paid for and the activation system will be permanently disabled. Of course, 36 months is just an example, and the number of activation codes in the series which are stored by the microprocessor 5 can be more or less depending upon the application. At block 122, if the strike counter was equal to 3 in block 103, then the input numbers are compared against a reset code, which, if valid, resets the system and flags the reset code so that it can't again be used to reset the system after a strike out. If the input numbers do not match the reset code, the system is shut down and cannot then be reset even with the valid reset code. At block 123, if the input code comparison in block 104 is invalid, the strike counter is incremented, and, at block 124, compared to the number 3. If this is the third strike, i.e. the third attempted invalid code entry, at block 125, the red LED 45 is turned on and the equipment 43 is disabled. At this point, not even a valid reset code will reset the system.

Figure 4:
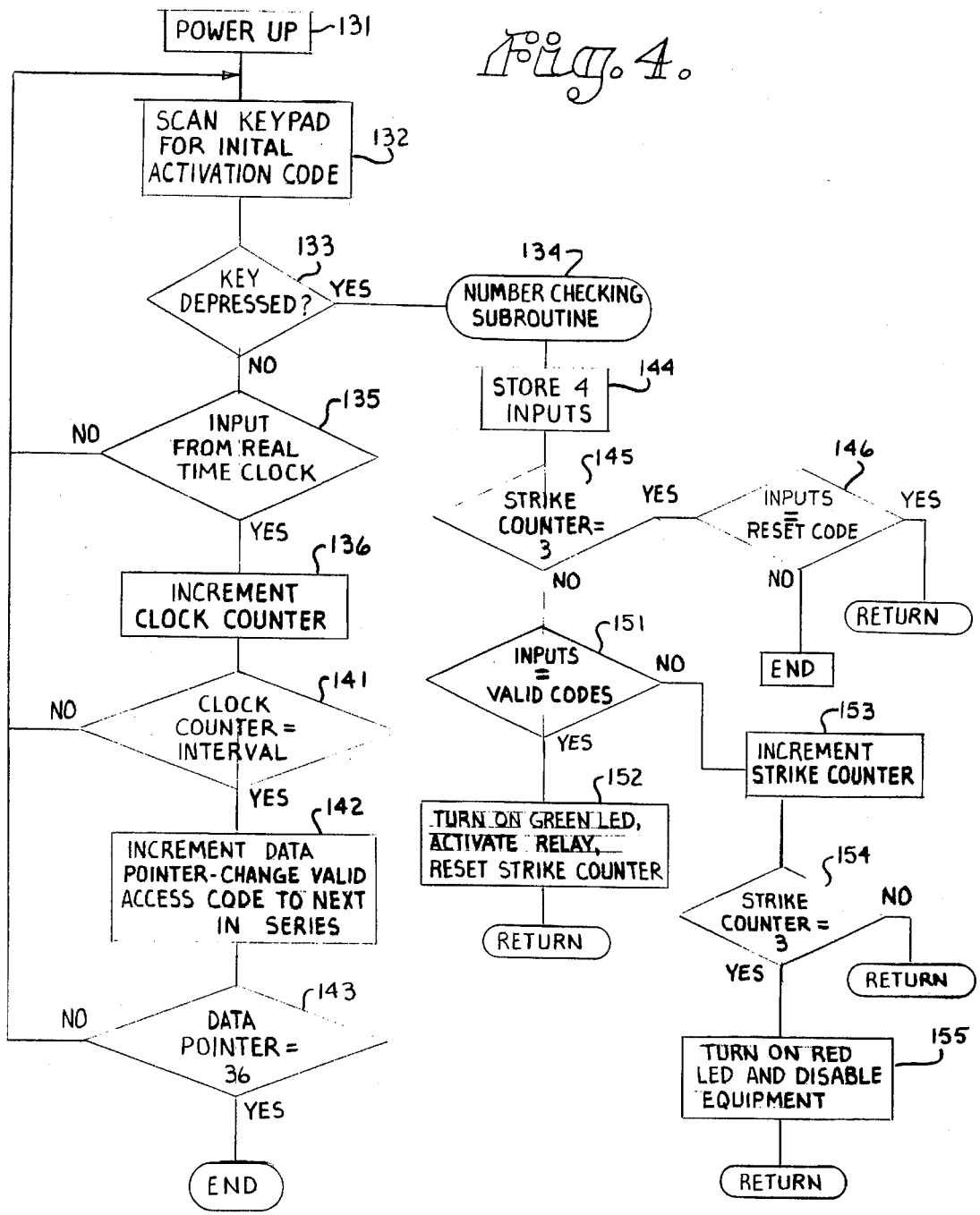
FIG. 4 is a logical flow chart illustrating a programmed algorithm for a second embodiment of the time cycled security code activation and control system.

FIG. 4 illustrates a flow chart depicting a program algorithm for a second embodiment of the system 1. In this embodiment, the equipment 43 is controlled by the activation code, i.e. it cannot be run at all without entering the current valid code. Thus, the code acts as a security code for the lessee or purchaser. In addition, the code is switched with the passage of each lease or payment period so that the lessee or purchaser cannot operate the equipment 43 unless he timely makes his payments. At block 131, the equipment 43 is sold or leased and the system is powered up. At this point, the lessee or purchaser is given the first month's valid code. At block 132, the system constantly scans for a keypad input, and, at block 133, if a key is depressed, a number checking routine is entered, at block 134. If no key is detected, at block 135, the input from the real time clock 25 is checked to see if a day has cycled, and, if it has, at block 136, the clock counter 46 is incremented. At block 141, the clock counter is compared against an interval, again such as 30 days. Once the interval is reached, at block 142, the data pointer is incremented, changing the valid code to the next stored code in the series. At block 143, if the data pointer is equal to a preset number, again such as 36, the program will end. In this embodiment, the end could entail simply leaving the final valid code in place as a permanent or user changeable security code. If the data pointer is not at the maximum number, the keypad 2 is scanned, this time for the new valid number. In this embodiment, any grace period can simply be included in the interval period.

The number checking subroutine 134 stores the four digits as they are keyed in, at block 144, and, at block 145, checks to see if the strike counter is equal to three. If it is equal to three, at block 146, the input numbers are compared to the reset code and the system is reset and the reset code flagged, as described above, if the input numbers are valid, or the system is shut down if invalid. If the strike counter is less than three, the input numbers are compared against the currently valid activation code at block 151, and, if valid, at block 152, the equipment 43 is activated, the green LED 44 is turned on, and the strike counter is reset to zero. If the entered code is invalid, at block 153, the strike counter is incremented, at block 154, the strike counter is compared to three, and, if equal to three, the red LED 45 is turned on and the equipment 43 is disabled at block 155.

The inventive time cycled security code activation and control system 1 thus provides a convenient and reliable way for a seller or lessor of power equipment 43 to insure the timely collection of installment sales or lease payments. In the second embodiment, the system 1 can also double as a security code control which functions to protect the equipment 43 for the benefit of the purchaser or lessee.

It is to be understood that while certain forms of the present invention have been illustrated and described herein, it is not to be limited to the specific forms or arrangement of parts described and shown.

What is claimed and desired to be secured by Letters Patent is as follows:

1. A time cycled security code and activation control system connected to control an electrical device, comprising:
   (a) a keypad for inputting a security activation code;
   (b) a programmable activation controller connected to said keypad, said controller including a memory for storing a series of activation codes, of which at least one is an active security activation code at a given time;
   (c) clock means connected to said controller;
   (d) comparator means for detecting when said clock means indicates the passage of each of a plurality of predetermined sequential time periods;
   (e) said controller including data pointer means for automatically sequentially designating successive ones of the security activation codes within said series after the passage of corresponding ones of said predetermined time periods such that the security activation code within said series which said data pointer is designating becomes said active security activation code;
   (f) an activation switching means for selectively controlling a switch connected to said electrical device, said controller including means for selectively controlling said activation switching means to close said switch during a first of said predetermined time periods, but to open said switch after said first predetermined time period and each subsequent time period has passed until the currently active security activation code is input;
   (g) means for detecting each attempted entry of an invalid code on said keypad;
   (h) strike out counting means for counting the number of attempted entries of an invalid code without the entry of the currently active security activation code;
   (i) disabling means connected to said strike out means for disabling said activation switching means when the number of detected invalid code entries is equal to a predetermined number, said disabling means preventing said control system from accepting the currently active security activation code;
   (j) enabling means for reenabling said activation switching means upon detecting the entry of a reset code on said keypad;
   (k) flagging means responsive to the correct entry of said reset code for flagging said reset code to render it invalid such that said activation switching means can no longer be reenabled by the entry of said reset code.

2. A system as in claim 1, wherein:
   (a) said comparator means recognizes the passage of an over-interval time period after each of said predetermined time periods, which over-interval period is shorter than said predetermined time periods, said over-interval period serving as a grace period during which the switch remains closed without the entry of the currently active security activation code.

3. A system as in claim 2, and further comprising:
   (a) indicators on said keypad for signalling said grace period and the expiration thereof.

4. A time cycled security code and activation control system connected to control an electrical device, comprising:
   (a) a keypad for inputting a security activation code;
   (b) a programmable activation controller connected to said keypad, said controller including a memory for storing a series of activation codes, of which at least one is an active security activation code at a given time;
   (c) clock means connected to said controller;
   (d) comparator means for detecting when said clock means indicates the passage of each of a plurality of predetermined sequential time periods;
   (e) said controller including data pointer means for automatically sequentially designating successive ones of the security activation codes within said series after the passage of corresponding ones of said predetermined time periods such that the security activation code within said series which said data pointer is designating becomes said active security activation code;
   (f) means for detecting the attempted entry of an invalid code on said keypad; an activation switching means for selectively controlling a switch connected to said electrical device, said controller including means for selectively controlling said activation switching means to normally open said switch during an initial one of said predetermined time periods, but to close said switch upon the entry of a currently active security activation code on said keypad;
   (h) said controller including strike out counting means for detecting and counting attempted entries of invalid codes without the entry of the currently active security activation code;
   (i) disabling means connected to said strike out means for disabling said activation switching means when the number of detected invalid code entries is equal to a predetermined number, said disabling means preventing said control system from accepting the currently active security activation code;
   (j) enabling means for reenabling said activation switching means upon detecting the entry of a reset code on said keypad; and
   (k) flagging means responsive to the correct entry of said reset code for flagging said valid reset code to render it invalid such that said activation switching means can no longer be reenabled by the entry of said reset code.

5. A system as in claim 4, wherein:
   (a) after said comparator means recognizes the passage of each of said predetermined time periods, said controller resets said clock means and changes said data pointer means to switch the currently active security activation code to the next code in said series and said controller controls said activation switching means to normally open said switch during each subsequent time period, but to close said switch only upon the entry of said the security activation code which is currently active at the time of entry.

* * * * *